US009984437B2

(12) United States Patent
Thienphrapa et al.

(10) Patent No.: US 9,984,437 B2
(45) Date of Patent: May 29, 2018

(54) AUTOMATIC ONLINE REGISTRATION BETWEEN A ROBOT AND IMAGES

(75) Inventors: Paul Thienphrapa, Baltimore, MD (US); Bharat Ramachandran, Morganville, NJ (US); Aleksandra Popovic, New York, NY (US)

(73) Assignee: Koninklijke Philips N.V., Eindhoven (NL)

( * ) Notice: Subject to any disclaimer, the term of this patent is extended or adjusted under 35 U.S.C. 154(b) by 506 days.

(21) Appl. No.: 14/342,403

(22) PCT Filed: Sep. 5, 2012

(86) PCT No.: PCT/IB2012/054579
§ 371 (c)(1),
(2), (4) Date: Mar. 3, 2014

(87) PCT Pub. No.: WO2013/038301
PCT Pub. Date: Mar. 21, 2013

(65) Prior Publication Data
US 2014/0212025 A1    Jul. 31, 2014

Related U.S. Application Data

(60) Provisional application No. 61/533,808, filed on Sep. 13, 2011.

(51) Int. Cl.
*G06T 3/00* (2006.01)
*G06T 7/73* (2017.01)

(52) U.S. Cl.
CPC .............. *G06T 3/0068* (2013.01); *G06T 7/73* (2017.01); *G06T 2207/10136* (2013.01);
(Continued)

(58) Field of Classification Search
CPC ...... G06T 3/0068; G06T 7/004; G06T 7/0042; G06T 2207/10132; G06T 2207/10136;
(Continued)

(56) References Cited

U.S. PATENT DOCUMENTS 5,676,673 A  * 10/1997  Ferre .................. A61B 34/20
                                                        606/1
5,951,475 A  *  9/1999  Gueziec .............. A61B 19/52
                                                        128/922

(Continued)

FOREIGN PATENT DOCUMENTS

EP        1910040 B1      4/2008
JP        S54123277 A     9/1979
(Continued)

OTHER PUBLICATIONS

Novotny et al, "Real-Time Visual Servoing of a Robot Using Three-Dimensional Ultrasound", IEEE International Conference on Robotics and Automation, Apr. 10-14, 2007, pp. 2655-2660.
(Continued)

*Primary Examiner* — Rodney A Butler
*Assistant Examiner* — Tamara L Weber

(57) ABSTRACT

A registration system and method includes a configurable device (104) having one or more moveable features (122) such that movement of the moveable features can be determined relative to a reference to define a specific configuration of the configurable device. An imaging system (110) has a display on which the configurable device is viewable. A processing device (112) is configured to register the configurable device with a coordinate system of the imaging system based on the specific configuration of the configurable device.

10 Claims, 6 Drawing Sheets

(52) U.S. Cl.
CPC ............. *G06T 2207/30048* (2013.01); *G06T 2207/30204* (2013.01); *Y10S 901/46* (2013.01); *Y10S 901/47* (2013.01)

(58) Field of Classification Search
CPC . G06T 2207/30048; G06T 2207/30204; Y10S 901/46; Y10S 901/47
See application file for complete search history.

(56) References Cited

U.S. PATENT DOCUMENTS

| | | | |
|---|---|---|---|
| 6,006,126 A * | 12/1999 | Cosman | A61B 19/20 600/414 |
| 6,167,292 A | 12/2000 | Badano et al. | |
| 6,246,898 B1 * | 6/2001 | Vesely | A61B 5/0422 600/424 |
| 6,674,916 B1 * | 1/2004 | Deman | G06T 3/0068 382/128 |
| 6,675,810 B2 | 1/2004 | Krag | |
| 7,155,316 B2 * | 12/2006 | Sutherland | A61B 19/22 318/568.11 |
| 7,930,065 B2 | 4/2011 | Larkin et al. | |
| 8,224,420 B2 | 7/2012 | Mu et al. | |
| 8,473,026 B2 * | 6/2013 | Ferre | A61B 5/06 600/407 |
| 8,734,349 B2 | 5/2014 | Kruecker | |
| 8,781,630 B2 * | 7/2014 | Banks | A61B 6/4458 378/197 |
| 8,831,303 B2 | 9/2014 | Villain | |
| 9,265,572 B2 * | 2/2016 | Fuchs | A61B 8/00 |
| 2001/0012327 A1 * | 8/2001 | Loser | A61B 6/12 378/42 |
| 2003/0109780 A1 * | 6/2003 | Coste-Maniere | A61B 19/22 600/407 |
| 2004/0162486 A1 * | 8/2004 | Stoianovici | A61B 6/032 600/427 |
| 2006/0217841 A1 * | 9/2006 | Matsumoto | B25J 9/1669 700/248 |
| 2007/0021738 A1 * | 1/2007 | Hasser | A61B 8/4218 606/1 |
| 2007/0197896 A1 * | 8/2007 | Moll | A61B 1/00039 600/407 |
| 2008/0118116 A1 * | 5/2008 | Chandonnet | A61B 34/20 382/128 |
| 2008/0130965 A1 * | 6/2008 | Avinash | A61B 90/36 382/128 |
| 2008/0294115 A1 * | 11/2008 | Chen | A61B 8/0833 604/173 |
| 2009/0054772 A1 | 2/2009 | Lin et al. | |
| 2009/0137952 A1 * | 5/2009 | Ramamurthy | A61B 5/06 604/95.01 |
| 2009/0198093 A1 * | 8/2009 | Meissner | A61B 17/12136 600/2 |
| 2010/0839642 | 2/2010 | Prisco et al. | |
| 2010/0119146 A1 | 5/2010 | Inazumi | |
| 2010/0249800 A1 * | 9/2010 | Kim | A61B 6/4014 606/130 |

FOREIGN PATENT DOCUMENTS

| | | |
|---|---|---|
| JP | S63163907 A | 7/1988 |
| JP | H02262991 A | 10/1990 |
| RU | 2161085 C1 | 12/2000 |
| WO | 2007003949 A1 | 1/2007 |

OTHER PUBLICATIONS

Fichtinger et al, "Robotically Assisted Prostate Brachytherapy With Transrectoal Ultrasound Guidance-Phantom Experiments", Brachytherapy, vol. 5, No. 1, Jan. 1, 2006, pp. 14-16.
Tokuda et al, "Integrated Navigation and Control Software System for MRI-Guided Robotic Prostate Interventions", Computerized Medical Imaging and Graphics, Voll 34, No. 1, Jan. 1, 2010, pp. 3-8.
Fronheiser et al, "Vibrating Interventional Device Detection Using Real-Time 3-D Color Doppler", IEEE Transactions on Ultrasonics, vol. 55, No. 6, Jun. 1, 2008, pp. 1355-1362.
Xu et al, "Error Propagation of the Robotic System for Liver Cancer Coagulation Therapy", Proc. IEEE in. Conf. Mechatronics and Automation, 2009, Pagesa 1789-1794.
Heger et al, "Trackerless Ultrasound-Integrated Bone Cement Detection Using a Modular Minirobot in Revision Total Hip Replacement", in Medicine, vol. 224, 2010, pp. 681-690.
Anonymous, Devinci Canvas: A Telerobotic Surgical System With Integrated, Robot Assisted Laparoscopic Ultrasound Capability.

* cited by examiner

AUTOMATIC ONLINE REGISTRATION BETWEEN A ROBOT AND IMAGES

CROSS-REFERENCE TO PRIOR APPLICATIONS

This application is the U.S. National Phase application under 35 U.S.C. § 371 of International application Serial No. PCT/IB2012/054579, filed on Sep. 5, 2012, which claims the benefit of U.S. Application Ser. No. 61/533,808, filed on Sep. 13, 2011. These applications are hereby incorporated by reference herein.

This disclosure relates to device registration and more particularly to a system, device and method for in-situ registration based on a configuration of the device.

Registration is the process of finding a relationship between different observations of the same data. More specifically, it is the computation of the alignment of multiple measurements of the same data owing to different points of view or belonging to different coordinate systems. Registration is needed to determine the correspondence between a physical location in a robot coordinate system and its position in imaging space.

In a clinical setup, registration between an ultrasound image and robot coordinates is performed prior to an operation. Preoperative registration, for which there exist well known techniques, is best suited for situations in which at least one coordinate system is fixed with respect to a world or global coordinate system. If both coordinate systems are moving, the one-time registration becomes invalid and must be recomputed.

In ultrasound based robot guidance, it is very likely that both devices, i.e., an ultrasound transducer and the robot, will be moving with respect to each other during the procedure. Although the ultrasound may sometimes be fixed at one position, it is beneficial to have flexibility in positioning, given that the role of ultrasound in robot guidance interventions is for both guiding the robot and for providing imaging on an area of interest. An example of a procedure requiring a registration between an ultrasound transducer (and subsequently, ultrasound images) and a robot includes a robotic structural heart repair. In this case, a Transesophageal Echocardiography (TEE) device is employed. The probe is mounted on a non-rigid cable causing it to move due to breathing. In this case, once established, registration may fail. Electromagnetic (EM) tracking for continuous registration of the robot and the ultrasound probe may be employed. This solution is complex and resource intensive. Also, EM tracking is prone to errors due to disturbances in the EM field.

Preoperative registration adds complexity to an already complex surgical workflow while the installation of fiducial markers increases surgery time and complexity. Tracking coordinate systems is cumbersome due at least to additional hardware requirements.

In accordance with the present principles, a registration system and method includes a configurable device having one or more moveable features such that movement of the moveable features can be determined relative to a reference to define a specific configuration of the configurable device. An imaging system has a display on which the configurable device is viewable. A processing device is configured to register the configurable device with a coordinate system of the imaging system based on the specific configuration of the configurable device.

A registration system includes a robot having one or more moveable features connected by N joints such that movement of the moveable features relative to a reference defines a specific configuration of the robot. An ultrasonic imaging system has a display on which the robot is viewable. A processing device is configured to register the robot with a coordinate system of an ultrasonic probe of the imaging system based on the specific configuration of the robot.

A registration method includes detecting a reference feature of a configurable device in an operational image of the configurable device; determining a specific configuration of the configurable device; computing the specific configuration of the configurable device in an imaging coordinate system using the reference feature; and determining a transformation between the specific configuration of the configurable device and the imaging coordinate system to register a coordinate system of the configurable device with the imaging coordinate system.

These and other objects, features and advantages of the present disclosure will become apparent from the following detailed description of illustrative embodiments thereof, which is to be read in connection with the accompanying drawings.

This disclosure will present in detail the following description of preferred embodiments with reference to the following figures wherein.

Figure 1:
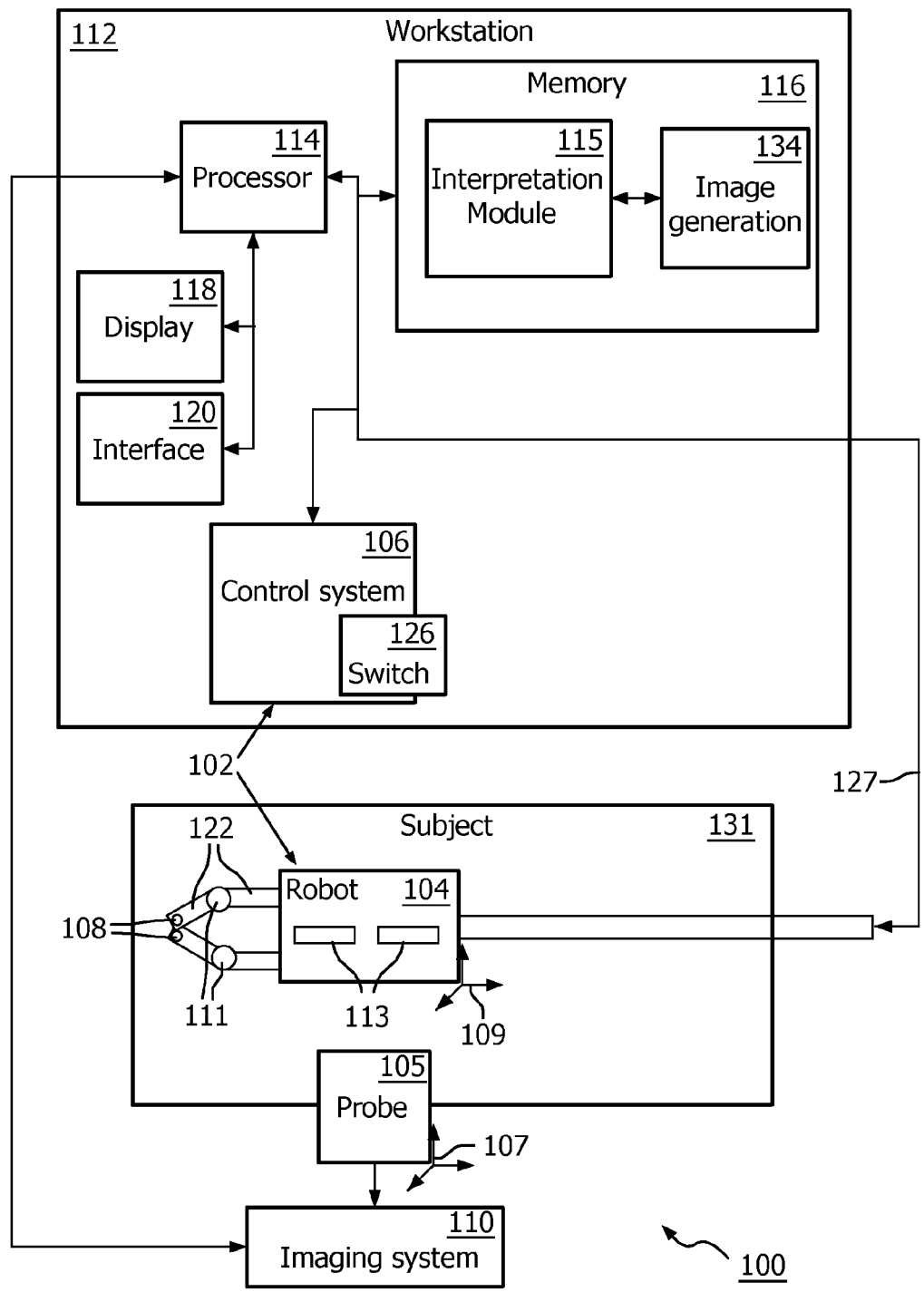
FIG. 1 is a block/flow diagram showing a system/method for registering a robot or other configurable device with an imaging stream or image in accordance with the present principles.

In accordance with the present principles, systems and methods for performing automatic and real-time registration between an imaging device, such as, an ultrasound (US) probe (e.g., a three-dimensional (3D) ultrasonic probe), and a robotic manipulator system are provided. These registration systems and methods may be employed in performing a variety of tasks such as, e.g., localization of targets, alleviation of cognitive load associated with alignment of the imaging probe, determination of a relationship of images to the physical world, guidance of a surgical tool to a target, etc. More complex surgical procedures may be performed by surgeons with the aid of the present embodiments employing these imaging and robotic capabilities.

In accordance with one particularly useful embodiment, a real-time registration of a robot to an imaging probe or image is provided using various methods and devices which permit detection of the robot or a surgical instrument mounted on the robot in the images. A quality control scheme allowing monitoring of the registration accuracy is also provided.

It should be understood that the present invention will be described in terms of medical instruments; however, the teachings of the present invention are much broader and are applicable to any instruments employed in tracking or analyzing complex biological or mechanical systems. In particular, the present principles are applicable to internal tracking procedures of biological systems, procedures in all areas of the body such as the lungs, gastro-intestinal tract, excretory organs, blood vessels, etc. The elements depicted in the FIGS. may be implemented in various combinations of hardware and software and provide functions which may be combined in a single element or multiple elements.

The functions of the various elements shown in the FIGS. can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), non-volatile storage, etc.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams and the like represent various processes which may be substantially represented in computer readable storage media and so executed by a computer or processor, whether or not such computer or processor is explicitly shown.

Furthermore, embodiments of the present invention can take the form of a computer program product accessible from a computer-usable or computer-readable storage medium providing program code for use by or in connection with a computer or any instruction execution system. For the purposes of this description, a computer-usable or computer readable storage medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring now to the drawings in which like numerals represent the same or similar elements and initially to FIG. 1, a system for automatic online registration 100 employs an image-guided surgical robot system 102. The robot system 102 includes a configurable device or robot 104 and a control system 106. The robot 104 includes a known shape, which may include a portion of the robot 104 or the entire robot 104. The robot 104 may include one or more fiducial markers 108. An orientation of the robot 104 is deciphered from kinematics of its moveable feature(s) 122 (e.g., links or linkages, appendages, etc.) and combined with an orientation computed from live images. The images may include ultrasound images although other imaging modalities may be employed, (e.g., X-rays, etc.). In the present example, an imaging system 110 includes an ultrasonic system having a three-dimensional (3D) imaging capability. Other imaging systems may also be employed. The imaging system 110 may employ a probe 105 to set a position and angle for collecting imaging data. The robot motion is employed to compute and update the registration between two coordinate systems in real time, e.g., a robot coordinate system 109 and an imaging or probe coordinate system 107.

The present principles provide for an online registration which is performed repeatedly as a normal part of an operation. Where components are expected to move, online registration can be used to handle misalignment between coordinate systems. Online registration is most effective if the system can perform registration automatically, aided either by optional tracking or fiducial markers 108. Tracking introduces a new global coordinate system in which the coordinate systems of interest can be measured. Use of fiducial markers 108 can be viewed a passive version of this approach, e.g., the coordinate systems of interest compute their respective orientations relative to globally fixed markers. In both cases, as the registration between coordinate systems can always be computed, the coordinate systems are free to move relative to each other.

System 100 may include a workstation or console 112 from which a procedure is supervised and/or managed. Workstation 112 preferably includes one or more processors 114 and memory 116 for storing programs and applications. Memory 116 may store a robotic kinetics interpretation module 115 configured to interpret positional feedback signals from an image or images of the robot device 104 as depicted using a given imaging modality. Module 115 may be configured to use the visual and positional feedback (e.g., electromagnetic (EM) tracking, fiducial positions, shape or geometric information/recognition, etc.) to reconstruct deformations, deflections and other changes associated with the robot 104.

The imaging modality or imaging device 110 may include an ultrasonic imaging system. The coordinate system 107 of the probe 105 and the coordinate system 109 of the robot 104 are preferably registered over a continuous or intermittent time interval. In one embodiment, a 3D ultrasound probe 105 capable of streaming live images is employed. The robot 104 is preferably positioned within a viewing region of the ultrasonic image. The robot 104 includes N joints 111 (e.g., 3 or 4) and N encoders 113 are employed to measure an absolute or relative position of the joints 111. Thus, the position of the entire robot 104, as well as an end-effector (e.g., a surgical instrument) with respect to some fixed coordinate system (usually the base of the robot 104) is known at all times.

The control unit 106 may be incorporated in the workstation 112 or may be a separate device (for example, a personal computer (PC) receiving data from the imaging device 110 and other parts of the robotic system 102 and performing the registration (methods). The control system 106 and/or interpretation module 115 may employ methods of automatic detection of a surgical instrument in an image and employ mechanisms to enhance the detection. For example, a technique to compute an instrument's configuration in the imaging device's coordinate system may include employing an image recognition program, which may decipher a plurality of points (e.g., joints or end portions) of the robot 104 to detect its configuration relative to a reference position. Another method includes performing an automatic and online registration between the 3D ultrasound probe 105 and the robot 104 using a known position/orientation of the robot 104 and a computed position/orientation of the robot 104 from an ultrasound image of the robot 104.

Registration error can be monitored for image frames by module 115 and be used to trigger a dead-man switch or other mechanism 126 to have the control system 106 disable the robot 104 and stop operation in accordance with a user-defined threshold or other conditions.

The imaging device 110 may be employed for in-situ imaging of a subject 131 during a procedure. Imaging system 110 may include a fluoroscopy system, a computed tomography (CT) system, etc. although an ultrasonic system is preferred. The imaging system 110 generates images 134 of a region in the subject 131 and the robot 104 is preferably included in the field of view or at least portions of the robot 104 needed to register the robot coordinate system with that of the imaging device 110.

Workstation 112 includes a display 118 for viewing internal images of a subject (patient) 131. Display 118 may also permit a user to interact with the workstation 112 and its components and functions, or any other element within the system 100. This is further facilitated by an interface 120 which may include a keyboard, mouse, a joystick, a haptic device, or any other peripheral or control to permit user feedback from and interaction with the workstation 112.

Figure 2:
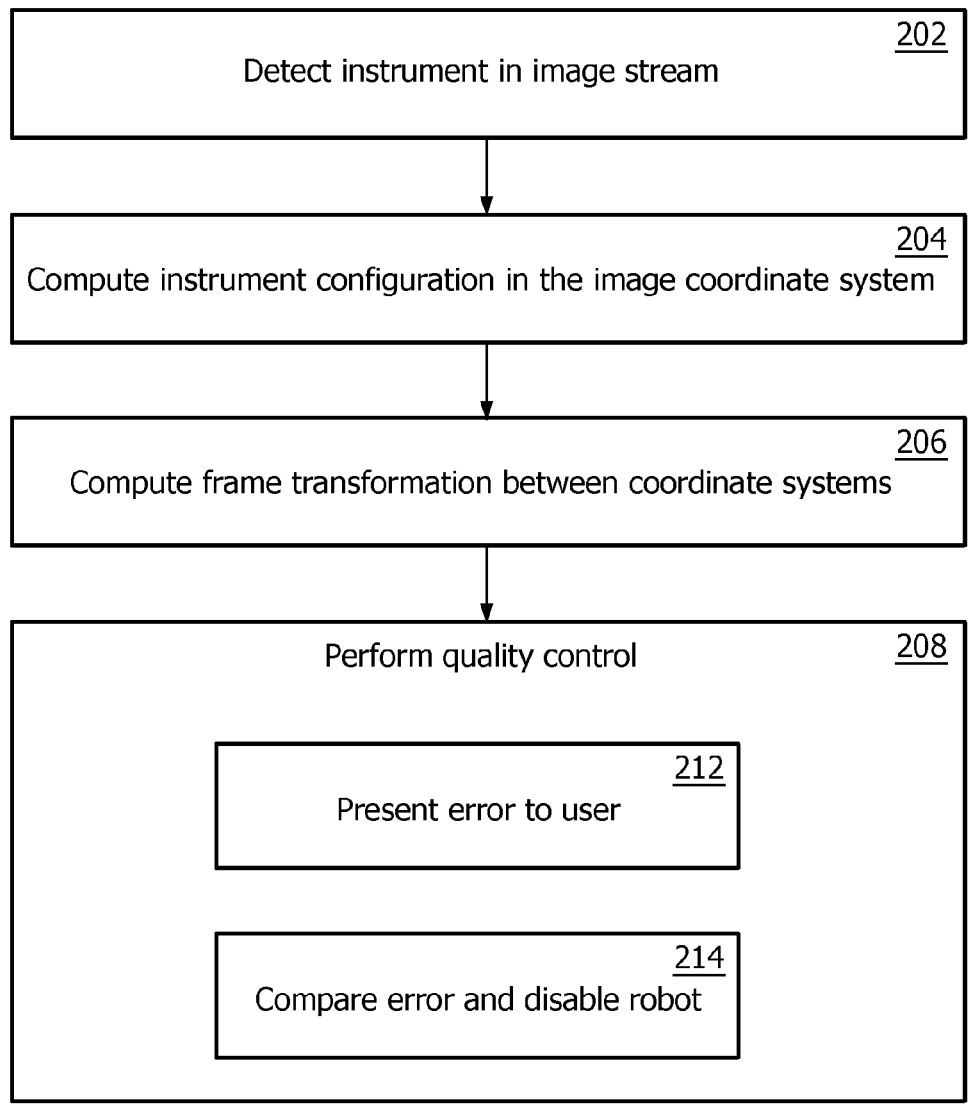
FIG. 2 is a block/flow diagram showing a method for registering a robot with an imaging system in accordance with one illustrative embodiment.

Referring to FIG. 2, an automatic online registration method is illustratively shown. In block 202, an instrument is detected in a 3D (e.g., ultrasound) image stream. In block 204, the instrument's configuration is computed in the image coordinate system. In block 206, frame transformation is computed to register the instrument with the image stream. In block 208, quality control is performed. These steps are described in further detail below with respect to following illustrative embodiments.

In one embodiment, the instrument detection in 3D ultrasound of block 202 may employ an image-based method. Surgical instruments are commonly composed of material, e.g., metal, which is visible under ultrasound imaging. Furthermore, the surgical instruments may feature a longitudinally disposed axis (a shaft or the like) to permit a surgeon or robot to operate in confined spaces. Using the elongated nature of the surgical instrument or other distinctive features, a reference is provided, which an imaging algorithm can exploit to properly detect the instrument in an ultrasound image in an automated fashion. One existing technique/algorithm is the known Hough Transform, which can segment a surgical instrument from an image based on knowledge of its shape. In one case, a line or rod shape (corresponding to the instrument shaft) can serve as an input parameter to the algorithm, while, for advanced detection, more complex shapes can be specified.

In another embodiment, the instrument detection in 3D ultrasound of block 202 may employ a fiducial-based method. Different types of fiducial markers may be used to facilitate detection of tool position and orientation. Given that fiducial markers appear with a high contrast in the images, detection of these markers in the images can be performed using image processing methods known in art, such as, e.g., the Hough transform, image thresholding, etc. While instruments may be visible in ultrasound images, their boundaries may be difficult to discern. This can lead to errors in automated instrument detection.

Figure 3:
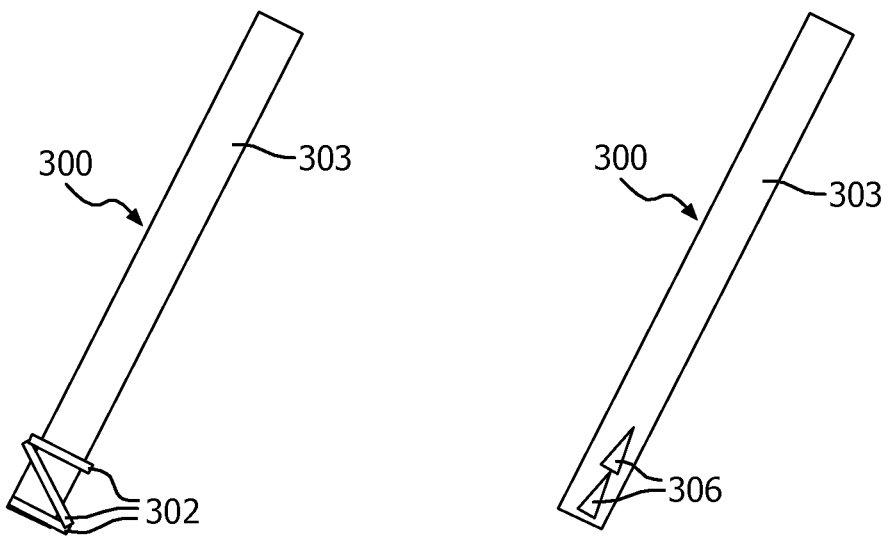
FIG. 3 is a diagram showing a shaft or link of a robot having one or more markers included for identifying a portion of the shaft or link in an image stream in accordance with useful embodiments.

Referring to FIG. 3, to address boundary visibility issues, a tool 300 can be augmented with markers 302 that are easy to distinguish by automated algorithms, but do not interfere with the task at hand. For example, rings 302 placed around a tool shaft 303 result in an ultrasound-visible pattern of bumps that is distinct for each orientation of the tool 300. This approach may employ specialized machining or fabrication of the surgical tools 300. A practical solution would permit retro-fitting already existing tools to provide a small detachable marker 306 that fits around the shafts of existing surgical instruments, thereby alleviating the need to redesign the tools. These detachable markers 306 include distinct patterns such that tool orientations are discernable by automated detection algorithms under ultrasound or other imaging. The markers 302, 306 can be made of hyperechoic materials, such as polymers or metal.

One embodiment provides smaller and simpler markers 306, and may include having multiple markers clipped onto the tool shaft 303. The composition of these markers 306 may include steel or any other echogenic material that is compatible with a surgical environment.

Figure 4:
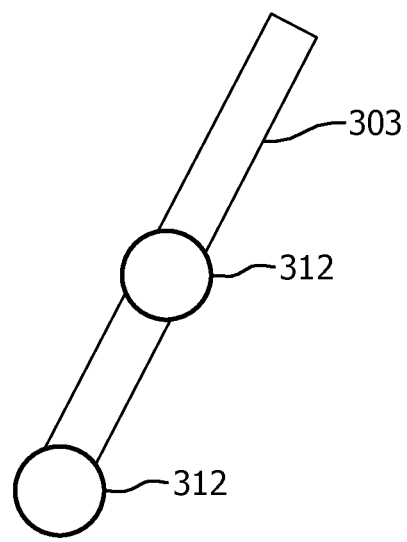
FIG. 4 is a diagram showing a shaft or link of a robot having two markers included for identifying an orientation of the shaft or link in an image stream in accordance with useful embodiments.

Referring to FIG. 4, to detect the orientation of the shaft 303, only two points along the shaft 303 need to be detected. In this case, a simpler embodiment of the marker takes the form of, e.g., spheres 312. Algorithms for detecting spherical shapes under ultrasound may include normalized cross correlation (NCC) and sum of squared difference (SSD). Other algorithms may be employed as well.

Figure 5:
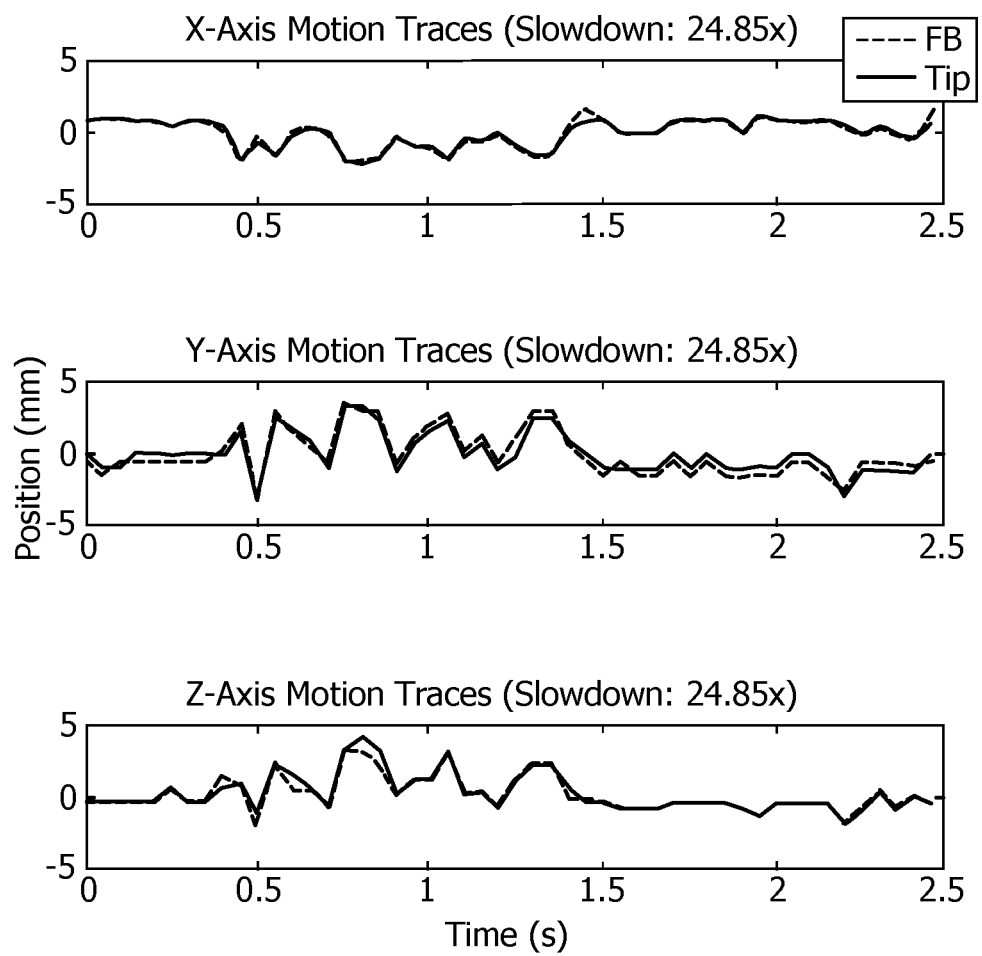
FIG. 5 is a diagram showing motion traces for x, y and z coordinates between a computed shaft tip and a coordinate system of an image in accordance with one illustrative embodiment.

FIG. 5 shows exemplary motion traces of a target (FB) and a robotic tool (Tip) that is tracking the target, both of which are detected in ultrasound at 20 frames per second using NCC. FIG. 5 shows x-axis motion traces slowed down 24.85 times; y-axis motion traces slowed down 24.85 times and z-axis motion traces slowed down 24.85 times. The markers employed in this were 3.2-mm metal spheres. The results indicate that NCC is a robust method for this application as the traces coincided well with each other.

Because the 3D ultrasound images are typically generated and processed at a rate of 20-30 frames per second, a new registration can be computed at that rate (for each new image). This is an advantageous feature as it alleviates the need for an explicit registration step, and perturbations in the position of the probe would not affect the registration over a period of time as the registration is continually being updated.

Figure 6:
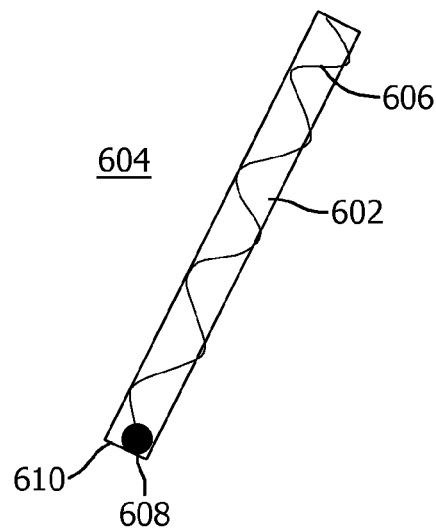
FIG. 6 is a diagram showing a shaft or link of a robot having a shape sensing optical fiber mounted thereon for identifying a position of the shaft or link in accordance with useful embodiments.

Referring to FIG. 6, a shaft 602 or other portion of a robot 604 may include a shape sensing optical fiber or fibers 606. In one embodiment, the detection of a marker or markers 608 may be provided by using the shape sensing optical fiber 606, which is wrapped about the shaft 602 or otherwise coupled with the shaft 602.

The sensing fibers 606 may include one or more fiber optic Bragg gratings (FBG), which are a segment of an optical fiber that reflects particular wavelengths of light and transmits all others. This is achieved by adding a periodic variation of the refractive index in the fiber core, which generates a wavelength-specific dielectric mirror. A FBG can therefore be used as an inline optical filter to block certain wavelengths, or as a wavelength-specific reflector.

The principle behind the operation of a FBG is Fresnel reflection at each of the interfaces where the refractive index is changing. For some wavelengths, the reflected light of the various periods is in phase so that constructive interference exists for reflection and consequently, destructive interference for transmission. The Bragg wavelength is sensitive to strain as well as to temperature. This means that FBGs gratings can be used as sensing elements in fiber optical sensors. One of the advantages of the technique is that various sensor elements can be distributed over the length of a fiber. Incorporating three or more cores with various sensors (gauges) along the length of a fiber that is embedded in a structure allows for evaluation of the curvature of the structure as a function of longitudinal position and hence for the 3 dimensional (3D) form of such a structure to be precisely determined.

As an alternative to FBGs, the inherent backscatter in conventional optical fibers can be exploited. One such approach is to use Rayleigh scatter in standard single-mode communications fiber. Rayleigh scatter occurs as a result of random fluctuations of the index of refraction in the fiber core. These random fluctuations can be modeled as a Bragg grating with a random variation of amplitude and phase along the grating length. By using this effect in three or more cores running within a single length of multicore fiber, the 3D shape and dynamics of the surface of interest would be trackable.

The optical fiber 606 could have light launched from a known position on the tool in a helical fashion and extend until a tip 610 of the shaft 602. This system could provide, in addition to the tip position and orientation, the entire shape information which would be valuable if the end effecter is a highly dextrous robotic manipulator with a high degree of freedom.

Figure 7:
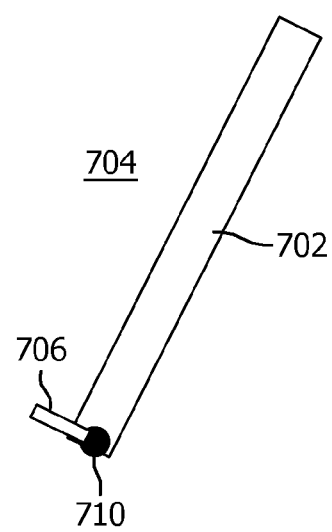
FIG. 7 is a diagram showing a shaft or link of a robot having a vibrating mechanism mounted thereon for identifying a position of the shaft or link in an ultrasonic environment in accordance with one embodiment.

Referring to FIG. 7, a shaft 702 or other portion of a robot 704 may include a motion device(s) 706. The motion device 706 may include a mechanical actuator or other vibrating element that can be visualized in an ultrasonic image. In one embodiment, the detection of marker 706 is provided by mechanical actuation of the marker 706 positioned at a tool tip 710. The tip 710 vibrates and since the tip 710 is attached to the robot 704, the marker 706 vibrates at a given frequency. These vibrations could easily be detected using ultrasound so that the marker position and tool tip can be detected. Inherent vibrations in the robot structure or links may also be employed to highlight images and detect structures.

Referring again to FIG. 2, in block 204, the instrument's configuration is computed in the ultrasound coordinate system. The task of instrument detection described is only the initial step in performing an online registration. The instrument has only been segmented from the rest of the image. In block 204, a configuration or pose of the instrument is computed given its representation extracted from the ultrasound image stream. This takes advantage of the fact that surgical tools commonly have long shafts between the handle (held by surgeon or robot) and end effector, which permits extension from the robot/hand to the surgical target site.

Once the shaft of the instrument is found in an ultrasound image, a vector describing the direction of the shaft is determined. The vector is used to compute the pose of the instrument in ultrasound coordinates ($^uT$) in real time, e.g., as new 3D ultrasound images are streamed.

Figure 8:
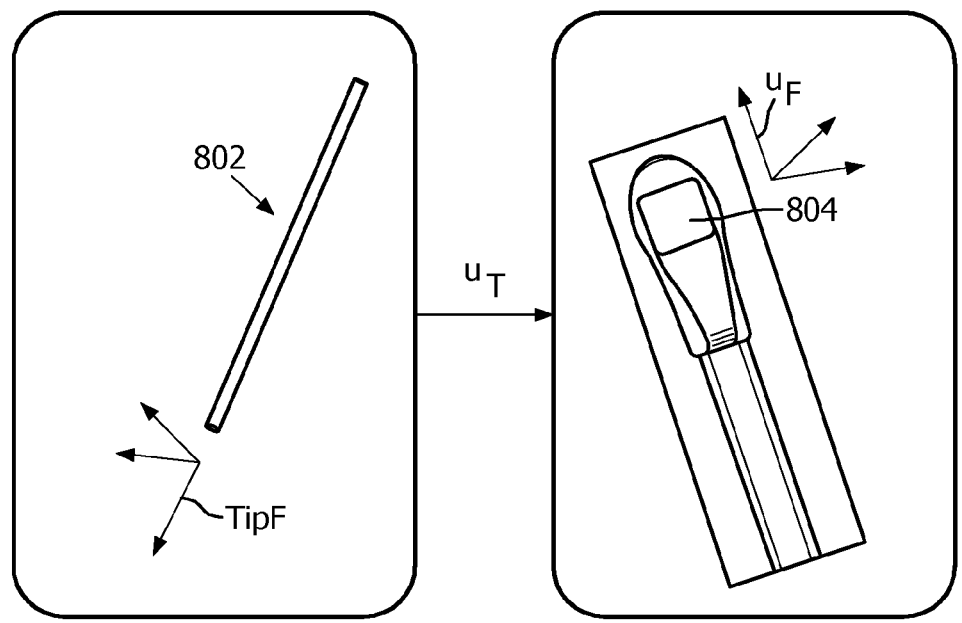
FIG. 8 is a diagram illustratively showing a transformation computation for registering a shaft or link of a robot with an image frame/imaging probe in accordance with one embodiment.

Referring to FIG. 8, a transformation/registration computation is illustratively shown. A tool shaft 802 includes a coordinate system $tip_F$, and an ultrasonic probe (or an image) 804 includes a coordinate system $u_F$. A vector $v_{tip}$, describing the direction of the shaft is determined in ultrasound coordinates in real time. The procedure that achieves this computation is shown in Eq. 1.

$$\bar{\omega} = |-\hat{z} \times v_{tip}|; \theta = \cos^{-1}(-\hat{z} \cdot v_{tip}/|v_{tip}|)$$
$$^uR = P + \cos\theta(I - P) + \sin\theta[\bar{\omega}]_\times$$
$$P = \bar{\omega} \otimes \bar{\omega}$$
$$^uT = \begin{bmatrix} ^uR & ^up_{tip} \\ 0 & 1 \end{bmatrix} \quad (1)$$

In Eq. 1, the subscripts and superscripts u and r denote ultrasound and robot coordinate systems respectively.

List of Symbols:

$^uT$—Pose of the instrument shaft as observed in ultrasound coordinates (4×4 transformation matrix).

$^uR$—Rotational component of the pose $^uT$ (3×3 matrix).

$^up_{tip}$—Positional component of the pose $^uT$, which is the position of the instrument tip in ultrasound coordinates (3×1 matrix).

$\bar{\omega}$—Axis of rotation between the instrument shaft and the −z axis of the ultrasound coordinate system; it is defined this way because in the local coordinate system of the instrument, the vector in the direction of the shaft towards the tip is defined as the −z axis.

$\theta$—Angle of rotation about $\bar{\omega}$ that matches the vector $v_{tip}$ to the ultrasound −z axis.

$v_{tip}$—Vector associated with the direction of the instrument shaft.

P—Result of the outer product operation on $\bar{\omega}$ with itself, stated as such to simplify the equations.

I—3×3 identity matrix.

$[\bar{\omega}]_\times$—Skew operator on $\bar{\omega}$, which is the equivalent of converting it to the first operand of a cross product operation when the operation is expressed in matrix notation.

Referring again to FIG. 2, in block 206, a computation of a frame transformation is performed. The pose $^rT$ of the instrument in robot coordinates is given by the known kinematics of the robot (from encoders and the like). Software programming interfaces to robots permit this parameter to be queried in real time. Once $^rT$ is obtained, it can be combined with the pose of the instrument in ultrasound coordinates $^uT$ found in the previous step (block 204) to compute the desired transformation $^rT_u$ (Eq. 2) between ultrasound and robot coordinate systems. This transformation $^rT_u$ can then be used to find the location relative to the robot of any point found in the ultrasound images, allowing the robot to move a surgical tool towards any target based on detection of the target in the ultrasound image, and ultimately allowing the robot to perform some functions autonomously under the guidance of 3D ultrasound and the associated image processing as described.

$$^rT_u = ^rT \cdot ^uT^{-1} \quad (2)$$

where:

$^rT_u$—Transformation matrix between ultrasound and robot coordinates.

$^u$T—Pose of the instrument shaft as observed in ultrasound coordinates.

$^r$T—Pose of the instrument shaft in robot coordinates, according to robot kinematics.

For simplicity, the surgical instruments described herein have been symmetric with respect to rotations about their shaft. Such an instrument can be labeled as 5 dimensional (5D) following the robotics parlance, which accounts for the 3D position in space as well as rotations about two of the three coordinate axes. An extension to 6D, the extra dimension being a rotation of the instrument about its shaft, is easily achieved by either (1) a single appropriately designed marker, or (2) an appropriate placement of multiple simple markers in an asymmetric geometrical pattern. The present principles may be extended to accommodate any kinematics and structural motions.

Referring again to FIG. 2, in block 208, quality control for the present embodiments may take the form of computing and accounting errors in the computations. The system and methods described herein permit an on-line query of the registration accuracy that can be provided to the user of the system for quality control. The accuracy of the registration can be measured as a difference in relative displacement of tool tip and tool orientation between two or more frames of ultrasound images. Here, we present a method to evaluate the tip, orientation.

The error (e) is:

$$e = \sqrt{\|{}^r p_{tip}(t-1) - {}^r p_{tip}(t)\|^2 - \|{}^u p_{tip}(t-1) - {}^u p_{tip}(t)\|^2}$$

where $^r p_{tip}(t-1)$ is the position of robot tip in the robot coordinate system in time moment t−1.

$^r P_{tip}(t)$ is the position of robot tip in the robot coordinate system in time moment t (one frame after t−1).

$^u p_{tip}(t-1)$ is the position of robot tip in the ultrasonic (US) coordinate system in time moment t−1.

$^u P_{tip}(t)$ is the position of robot tip in the US coordinate system in time moment t (one frame after t−1).

In block 212, the error can be presented to the user on the display 118 (FIG. 1), which may include the US screen of the imaging device. In block 214, the error can be used to trigger a dead-man switch or other mechanism of the robot and stop the operation in accordance with a user-defined threshold or other conditions.

It should be understood that the present embodiments may be employed in any minimally invasive surgery to allow for registration between an imaging device (e.g., ultrasound probe) and a surgical robot or other device without the need for preoperative registration, fiducials placed on the patient, manual intervention, or a fixed ultrasound probe. The registration provides the robotic system with a mapping between imaging and robot coordinates, thus permitting the robot or other device to move the instrument towards any target detected in the image. The present principles are readily applicable to a wide class of robotic systems or devices, procedures and applications.

Figure 9:
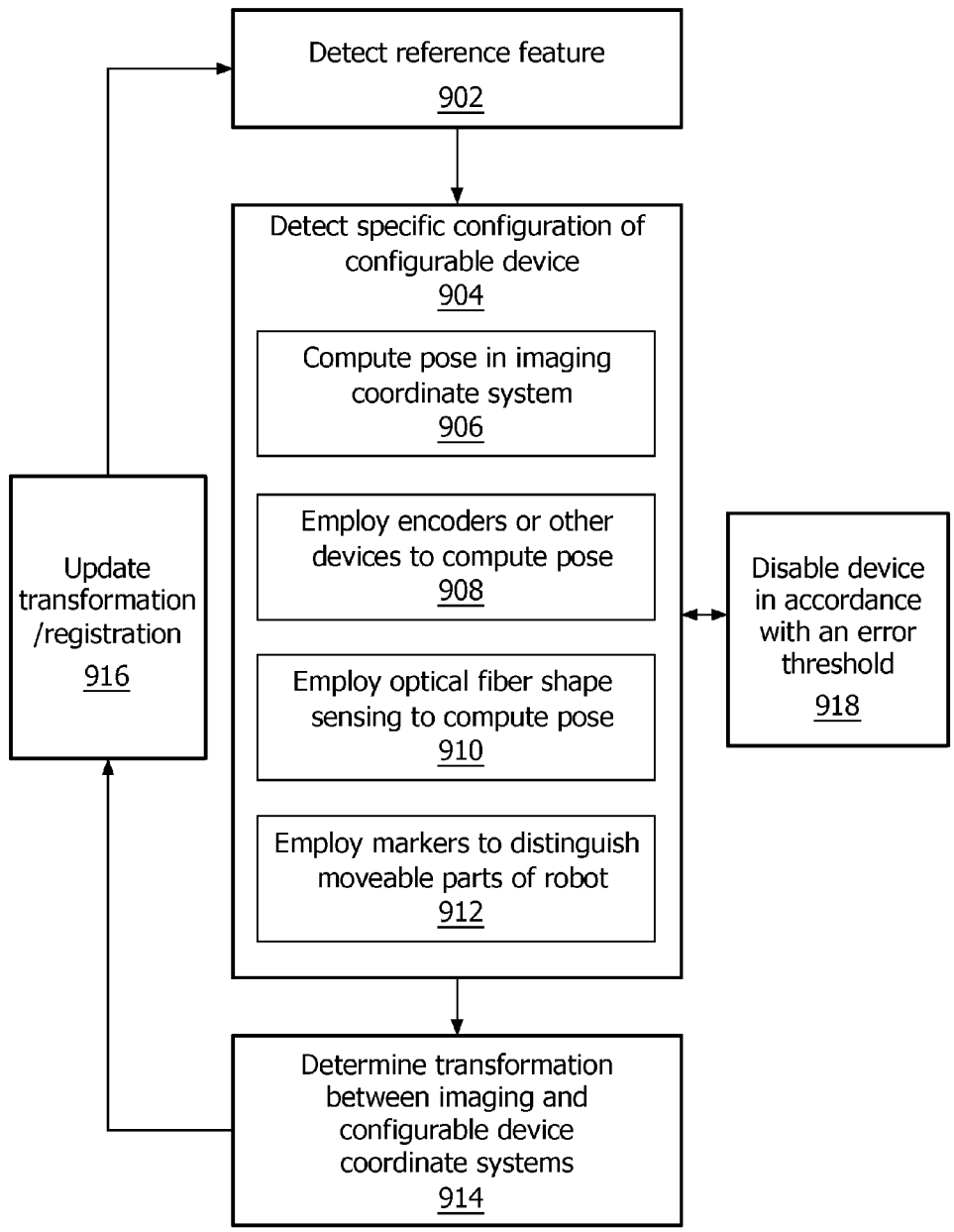
FIG. 9 is a block/flow diagram showing steps for registering a robot device with an imaging coordinate system in accordance with an illustrative embodiment.

Referring to FIG. 9, another registration method in accordance with the present principles is illustratively shown. In block 902, a reference feature of a configurable device is detected in an operational image of the configurable device. This may include a longitudinal shaft, a robot base, a distinctive feature, etc. In block 904, a specific configuration of the configurable device is determined. For example, robot appendages may have a determined position computable from an encoder or other measurement device. The position of the appendage may be computed relatively from the reference position or feature. In block 906, the specific configuration or pose of the configurable device system is computed in an imaging coordinate system using the reference feature. The pose may include a determination of all or some of the features of the configurable device. For example, three out of four appendages may provide sufficient information on a position of the device. The specific configuration may include finding a pose of the configurable device using encoders to determine positions of moveable features of the configurable device in block 908.

In block 910, the specific configuration may be determined using shape sensing, with an optical fiber, where a movement of one or more moveable features of the configurable device may be determined using feedback from the optical fiber. In block 912, the one or more moveable features may include at least one marker to designate a position in images and determine the specific configuration using the at least one marker. The markers should be visible in the images and may include particular shapes or features to assist in accurately defining the configuration or pose of the device. The marker may include, e.g., a vibrating mechanism to designate the position or an orientation of the at least one or more moveable features. This is particularly useful in ultrasonic imaging.

In block 914, a transformation is determined between the specific configuration of the configurable device and the imaging coordinate system to register a coordinate system of the configurable device with the imaging coordinate system. The transformation permits conversion of any position in one coordinate system to the other. In block 916, a registration or transformation of the configurable device to the imaging coordinate system may be updated with a new image taken by the imaging system. This update may be done at every new frame or after a predetermined number of frames, as needed. The update is done in real-time during a procedure or operation. In block 918, the configurable device may be disabled or its operation altered based on a measured registration error. The registration error may be computed intermittently and employed for comparison against a threshold. If the threshold is exceeded, the device (e.g., a robot) is disabled until registration can be reestablished. Other actions may also be attached to the error computation such as, e.g., an alert sounds or an indicator lit, etc.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) no specific sequence of acts is intended to be required unless specifically indicated.

Having described preferred embodiments for systems and methods for automatic online registration between a robot and images (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the embodiments disclosed herein as outlined by the appended claims. Having thus described the details and particularity required by the patent laws, what is claimed and desired protected by Letters Patent is set forth in the appended claims.

The invention claimed is:

1. A registration system, comprising:
    a configurable device having one or more moveable features such that movement of the moveable features can be determined relative to a reference to determine a specific configuration of the configurable device;
    an imaging system configured to acquire images of the configurable device, said imaging system having a display on which the configurable device is viewable; and
    a processing device configured to register the configurable device with a coordinate system of the imaging system based on the specific configuration of the configurable device;
    wherein the configurable device includes a robot having at least one link.

2. The registration system as recited in claim 1, wherein the at least one link is coupled to a joint and further including an encoder configured to measure the movement of the joint.

3. The registration system as recited in claim 1, wherein the at least one link includes a shape sensing optical fiber and the movement of a shaft is measured using signals from the shape sensing optical fiber.

4. The registration system as recited in claim 1, wherein the at least one link includes an end portion and the end portion includes at least one marker to designate a position in images of the imaging system.

5. The registration system as recited in claim 4, wherein the at least one marker includes a shape or configuration to designate the position or an orientation of the at least one link.

6. The registration system as recited in claim 4, wherein the imaging system includes an ultrasonic system and the at least one marker includes a vibrating mechanism to designate the position or an orientation of the at least one link.

7. The registration system as recited in claim 1, wherein the configurable device includes the robot disposed within a living body and the imaging system includes an ultrasonic system that images a region of interest n the living body.

8. The registration system as recited in claim 1, further comprising a switch configured to disable the configurable device based on a measured registration error.

9. A registration system, comprising:
    a robot having one or more moveable features connected by N joints such that movement of the moveable features relative to a reference defines a specific configuration of the robot;
    an ultrasonic imaging system configured to acquire images of the robot, said ultrasonic imaging system having a display on which the robot is viewable; and
    a processing device configured to register the robot with a coordinate system of an ultrasonic probe of the ultrasonic imaging system based on the specific configuration of the robot.

10. The registration system as recited in claim 9, wherein the N joints are coupled to encoders to measure the movement of a respective joint.

* * * * *